(12) United States Patent
Wagner

(10) Patent No.: US 6,611,593 B1
(45) Date of Patent: Aug. 26, 2003

(54) CALL CONTROL OF ANCILLARY TELECOMMUNICATIONS EQUIPMENT USING CONTINUITY TESTS

(75) Inventor: Clint Wagner, Allen, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/375,675

(22) Filed: Aug. 17, 1999

(51) Int. Cl.[7] .................................................. H04M 9/08
(52) U.S. Cl. ........................ 379/406.04; 379/3; 379/28; 379/406.01; 370/286
(58) Field of Search ............................ 379/3, 399, 406, 379/407, 409, 410, 411, 9, 10, 15, 28, 406.01, 460.04; 375/345; 370/241, 242, 243, 244, 246, 286, 289

(56) References Cited

U.S. PATENT DOCUMENTS

| | | | |
|---|---|---|---|
| 5,530,724 A | * 6/1996 | Abrams et al. | 375/345 |
| 5,784,455 A | * 7/1998 | Edlinger et al. | 379/410 |
| 5,982,752 A | * 11/1999 | Katuszonek | 379/22 |
| 6,134,224 A | * 10/2000 | Reese et al. | 370/286 |

FOREIGN PATENT DOCUMENTS

EP      0884884 A2  * 12/1998  ............ H04M/3/40

* cited by examiner

Primary Examiner—Binh Tieu

(57) ABSTRACT

System and method for controlling an ancillary telecommunications device such as an echo canceller within a telecommunications system. The system and method include and involve a switching system that is configured to receive a call from a calling station and to route said call within said telecommunications system, and an ancillary telecommunications device that is configured to control a call processing parameter to affect the call. The switching system and the ancillary telecommunications device are coupled to each other via a channelized call data network. The channelized call data network is configured to communicate data corresponding to the call over at least one data channel. The ancillary telecommunications device may control the call processing parameter to affect the call based on a continuity test issued by the switching system to the ancillary telecommunications device prior to the call.

31 Claims, 7 Drawing Sheets

CALL CONTROL OF ANCILLARY TELECOMMUNICATIONS EQUIPMENT USING CONTINUITY TESTS

BACKGROUND OF THE INVENTION

1. Field of the Invention

The present invention is related to telecommunications network call connection management and call setup systems. More particularly, the present invention is related to control of ancillary telecommunications devices (e.g., echo cancelers, etc.).

2. Description of the Related Art

Modern telecommunications networks consist of a number of switching systems which are connected together via various transmission facilities. An example of a problem associated such networks faced by many providers is service quality and, in particular, the need to control echo. Echo is a transmission impairment that is related to delay, which in turn is a function of distance. To date, echo control devices external to the source have been installed in telecommunications networks to mitigate echo impairment.

Telecommunications networks have the ability to transport both voice-band applications (analog) and digital data applications via switching and interconnected transmission links. The problem arises when a network must pass digital data applications over the same transmission links as those used for voice and voice-band data and an echo control device is encountered. These echo control devices used in voice networks are installed to correct the impairments caused by delay. A voice-band data application will utilize its own means of controlling echo control devices. However, the digital data calls lack this same means.

Typically, in many telecommunications networks call connections are initiated and setup using two basic forms of signaling. The first is what is known as Channel Associated Signaling (CAS) and the other in Common Channel Signaling (CCS). Neither method provides for any type of discrimination between voice-band and digital data connections.

In a CAS environment, signaling bits are used to signal between switches to alert and establish calls. These signaling bits are also used by ancillary equipment that may be in the call path as an indication of an incoming call. Such devices monitor signaling bit status and respond accordingly. This type of signaling is referred to as robbed bit signaling, as part of the payload is used as signaling bits.

The CAS response to the onset of a call is that signaling bits respond in accordance with the trunk signaling requirements and not the requirements of the call type.

In a CCS signaling environment, the signaling for call setup is passed between network switches on a disassociated channel. In this signaling mode, the bearer (communications) channel retains all of the payload bits for the transmission of the payload.

There are certain abilities within a CCS system whereby the originating switching system does have an understanding of the call type at the onset of the call based on the properties of the originating connection type. These call types can be transmitted to any other switching system within a network in order to establish a call connection. The problem remains in that ancillary equipment such echo cancelers are stand alone devices that may not have connections to the switching system and therefore cannot be instructed to assess the nature of the connection type.

With the onset and deployment of CCS signaling, the inherent continuity testing based on in-band signaling response provided for an adequate means to ensure end-to-end circuit integrity. However, CCS signaling no longer uses the signaling bits to establish call connections. This mode uses an external link to transport call connection status between the network switches. In this mode there are no defined signaling bits, which in turn frees up these bits. Ancillary equipment must now rely on the detection of idle codes within the payload to detect the onset of a next call event.

In order to address the possibility of alarm masking due to multiple transmission types deployed in a network, the addition of COT (continuity test) tones was deployed during call setup to ensure transmission channel integrity. For the sake of clarity in the following examples defining the embodiment of the invention HI tone will be assigned for voice band connections whereas LO tone will be associated with connection for digital data. It is further understood that additional tones could be used to address additional levels of control for devices other than the exemplar echo control devices discussed in the following examples. The CCS mode still has the same problem inherent with CAS in that the operation of any ancillary equipment in the call connection can not be modified once prior to or once the connection is established.

COT tones and tests are well known and are defined in industry standards documentation identified as ITU-T Q724 for use on a four wire circuit as being a 2000 Hz tone, and for two wire circuits as being a 1780 Hz tone. In as much as two tones have been defined, this application designates the first tone as 'HI' and the second as 'LO'.

The following describes other methods for extending call by call control to ancillary equipment. These methods have both merit arid limitation that may preclude their use in a wide spread manner.

The use of the Facility Data Link (FDL) is being pursued in industry standards bodies as a means to address call by call control, but this implementation would require a network that supports an Extended Super Frame line formatting.

Another possible solution is the use of an external control link for the switch platform to the ancillary equipment. This would provide the necessary control function, but introduces several other issues such as cable management and records keeping issues that would be substantial for a large-scale implementation.

Accordingly, there exists a need to provide new and improved systems and methods that will permit better, more reliable control of ancillary telecommunications devices such as echo cancelers, etc. To be viable such systems and methods must permit wide-spread deployment without causing undue and expensive infrastructure enhancements.

SUMMARY OF THE INVENTION

System and method for controlling a telecommunications device such as an echo canceler within a telecommunications system. The system and method include and involve a switching system that is configured to receive a call from a calling station and to route said call within said telecommunications system, and an ancillary telecommunications device that is configured to control a call processing parameter to affect said call. The switching system and the ancillary telecommunications device are coupled to each other via a channelized call data network. The channelized call data network is configured to communicate data corresponding to the call over at least one data channel. The ancillary telecommunications device may control the call processing parameter to affect the call based on a continuity test issued by the switching system to the ancillary telecommunications device prior to and during the call.

BRIEF DESCRIPTION OF THE DRAWINGS

The present invention is described in detail below with reference to the following drawing figures, of which.

DETAILED DESCRIPTION OF THE PREFERRED EMBODIMENTS

Figure 1:
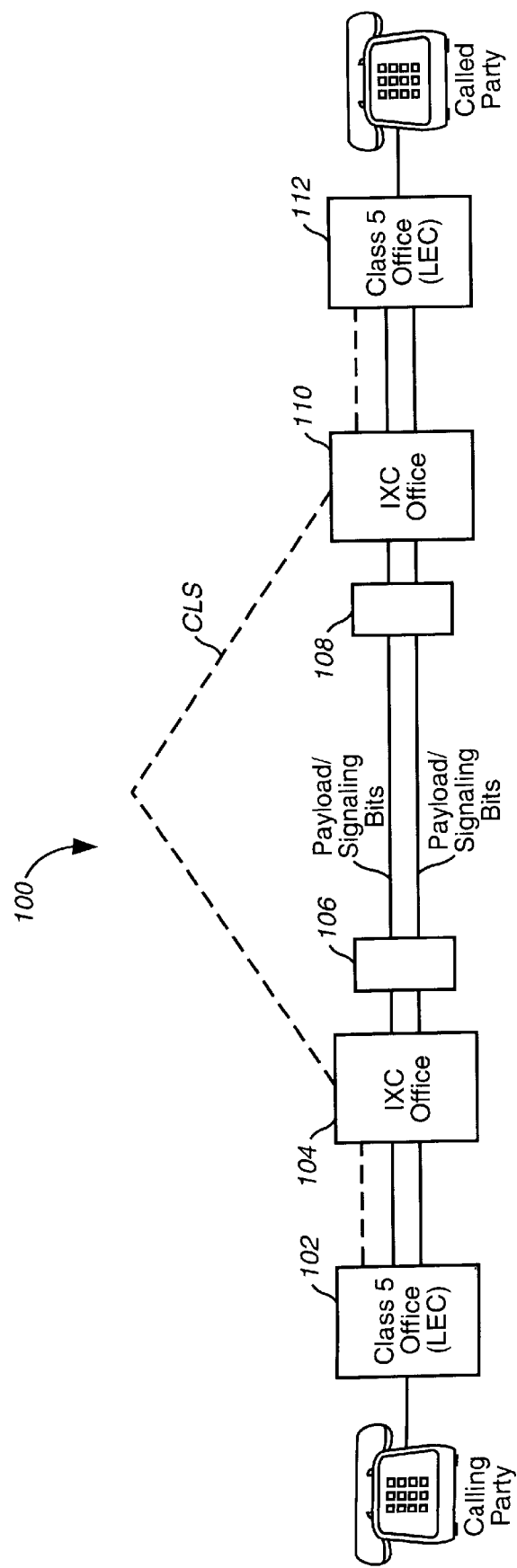
FIG. 1 is a diagram of a system in which ancillary telecommunications devices may be controlled using continuity tests (COT tests) prior to and during processing according to a preferred embodiment of the present invention.

The present invention is now described in detail with reference to the drawing figures that were briefly discussed above. A system overview is followed by a discussion of corresponding operational aspects. The present invention is related to the material described and disclosed in U.S. patent application Ser. No. 09/104,140, as "CONTROL OF ANCILLARY TELECOMMUNICATIONS EQUIPMENT," filed on Jun. 24, 1998, now U.S. Pat. No. 6,404,887 (commonly assigned), which application is hereby incorporated by reference.

Unless otherwise indicated, like parts, systems, and processes are referred to with like reference numerals.

System Overview & Structural Aspects of the Present Invention

To illustrate the novel features and aspects of the present invention, reference is generally made to FIG. 1. The structures shown in FIG. 1 are further described in the call processing scenarios illustrated and described in reference FIGS. 2, 3A, 3B, 3C, 4, 5, and 6 which are discussed in detail below.

Referring now to FIG. 1, depicted therein is a diagram of a system in which data transport takes place in a common channel signaling (CCS) environment. In system 100, ancillary telecommunications equipment may be controlled before call processing according to a preferred embodiment of the present invention. In particular, system 100 includes a telecommunications network that further includes a calling party located at a call initiation station, a class 5 office (local exchange carrier (LEC) central office) 102, an inter-exchange carrier (IXC) office 104, an ancillary telecommunications device 106 (e.g., an echo canceller used to inhibit echo conditions within voice communications over the telecommunications network in system 100), another ancillary communications device 108 (e.g., another echo canceller), an inter-exchange office (IXC) 110 (e.g., one operated by a long-distance telephone service provider), a class 5 office (local exchange carrier (LEC) central office) 112, and a called party located at a call termination station. In system 100, the calling party and the called party are outfitted with telephone termination equipment to support both voice and data communications.

In the context of the present invention, calls are routed between the calling party and the called party among switching systems maintained and managed by IXC 104 and IXC 110. The content of a call from the calling party to the called party, for example, is digital in nature and is transported in a channelized data network on which switching systems like or similar to those maintained by IXCs 104 and 110 are addressed as network elements. The solid lines coupling the network elements in system 100 are intended to identify the channelized data network over which call data is transported. The call processing and, in particular, the signaling necessary to transport and route a call from the calling party to the called party is carried over a disassociated channel and does riot form part of the data making up the channelized call data (i.e., the call payload). Accordingly, the telecommunications network in system 100 is one that allows signaling according to a common channel signaling paradigm as indicated by the dashed network links in system 100. Such a system will be immediately understood by those skilled in the art.

The present invention allows for the modification or control of ancillary transmission equipment in the call connection by redefining the use of existing call setup sequences. More particularly, the present invention utilizes continuity test tone (COT tones) in a CCS type signaling environment to effect such control and modification.

Accordingly, the present invention will allow implementation of call by call control as well as intra-call control of ancillary telecommunications devices and in so doing addresses the problems associated with various ancillary type devices such as:
- echo cancelers
- echo cancelers equipped with AT&T True Voice ("AT&T" and "True Voice" are trademarks and/or registered trademarks of AT&T CORPORATION.)
- allocation of bandwidth associated with DCME types of equipment
- support for ISDN type digital data calls
- switched 56/64 data calls and Nx56/64 data calls The present invention uses existing COT tones to establish call types prior to establishing call connections to provide direct call by call control.

An example of COT tone manipulation to achieve call by call control is as follows: All echo cancelers are in an active state and waiting for a next call event. Upon receipt of a call that requires an echo canceler to be inactive, a switch (a sending switch) will issue a specific COT tone (e.g., in this example the 'LO' tone). The echo control device will recognize this as a specific instruction and will respond by changing to a bypass state, in accordance with the present invention. At the completion of the call, the switch will again issue a COT tone that will reset the echo control device for the next call. Alternatively, if the next call event is of a different call type, the sending switch will issue the correct tone for that call type. Additional frequencies could be used as well depending on the nature and devices that need to be controlled.

An extension of such a process would be for the ancillary equipment to respond back to the switch as a way of receipting the instruction to activate/deactivate. In this manner the switch network could signal to other nodes in the network the need for or the prior application of the appropriate of the ancillary equipment.

Operational Aspects of the Present Invention

The structures described above are configured to operate together to allow ancillary telecommunications devices such as echo cancellers to be controlled-prior to and during a call within a telecommunications system. The structural aspects of the present invention necessary to achieve such results were addressed and described above. The corresponding operational aspects of the present invention are next described with reference to the diagrams and flowcharts found in FIGS. 2, 3A, 3B, 3C, 4, 5, and 6 to which references is now made. Such drawing figures illustrate the operations of the present invention by illustrating call processing scenarios that will be recognizable and explanatory to those skilled in the art. The applicability of the present invention and, in particular, the issuance of COT tones to achieve call by call control of ancillary telecommunications devices as provided by the present invention will be immediately understood by those skilled in the art after reviewing the discussions that follow.

In the paragraphs that follow, the term "point" is used to refer to particular points within a processing sequence related to a telephone call. Such points are illustrated in drawing FIGS. 2 and 4–6 by numbers within parenthesis.

Figure 2:
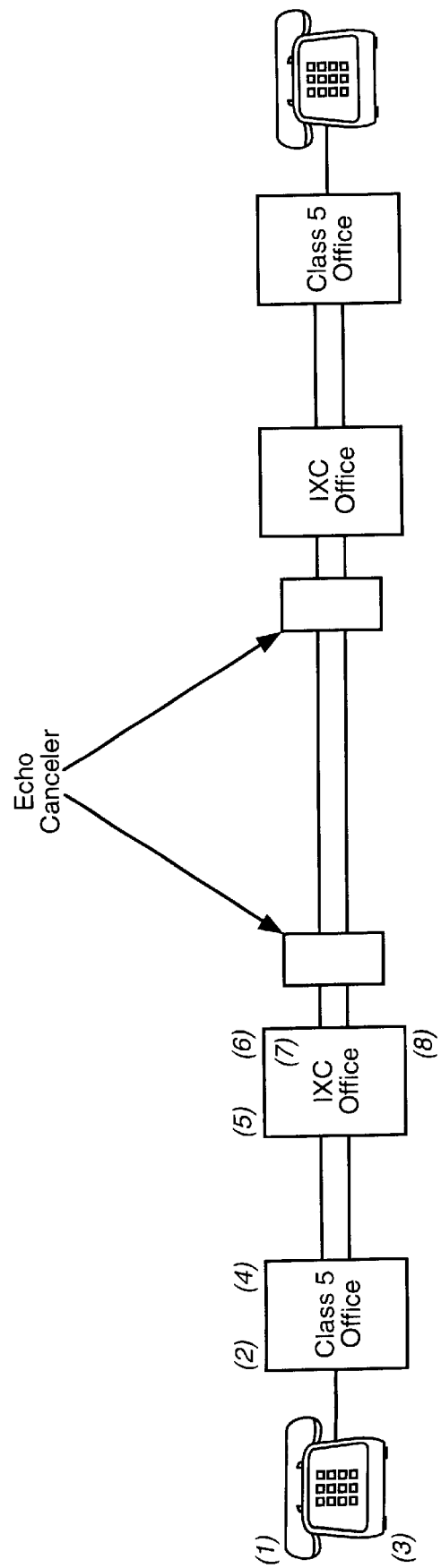
FIG. 2 is a block diagram that illustrates a first call processing scenario according to a preferred embodiment of the present invention.

Referring now to FIG. 2, depicted therein is a block diagram that illustrates a first call-processing scenario according to a preferred embodiment of the present invention. In particular, a COT tone is used as part of call setup to achieve ancillary device control. More particularly, a calling party goes off hook towards a local class 5 office at point 1. At point 2, a class 5 office responds with a dial tone which is supplied to the calling party at his telephone terminal device. At point 3, a calling party will dial the number for the termination location corresponding to the called party. At point 4, the class 5 switch forwards the dialed information to IXC switch under normal call flow. At point 5, the IXC switch interprets the call request for call routing accordingly. At point 6, the IXC switch selects an outbound termination trunk for forwarding the call.

At point 7, the IXC switch performs continuity (COT) test. The COT test/tone is transmitted in the direction of the called party, and the echo canceler reads the COT test signal and activates echo control accordingly. At point 8, the IXC switch receives an acknowledgement of the COT test from the distant-end switch at the distant-end IXC office.

In the aforementioned scenario, the conventional call implementation is unchanged except for the fact that the echo canceller was activated/deactivated in response to a directive in the form of a COT test/tone issued by the switching platform. This is different from normal call scenarios where the echo cancellers respond as an incidental act resulting from switching platforms signaling each other as in a CAS environment. In a CCS environment, activation of an echo canceller conveniently is a response to a change in the payload pattern that could be either an incidental result of a call connection, or as an actual change in payload due to user speech or data activity.

Figure 3A:
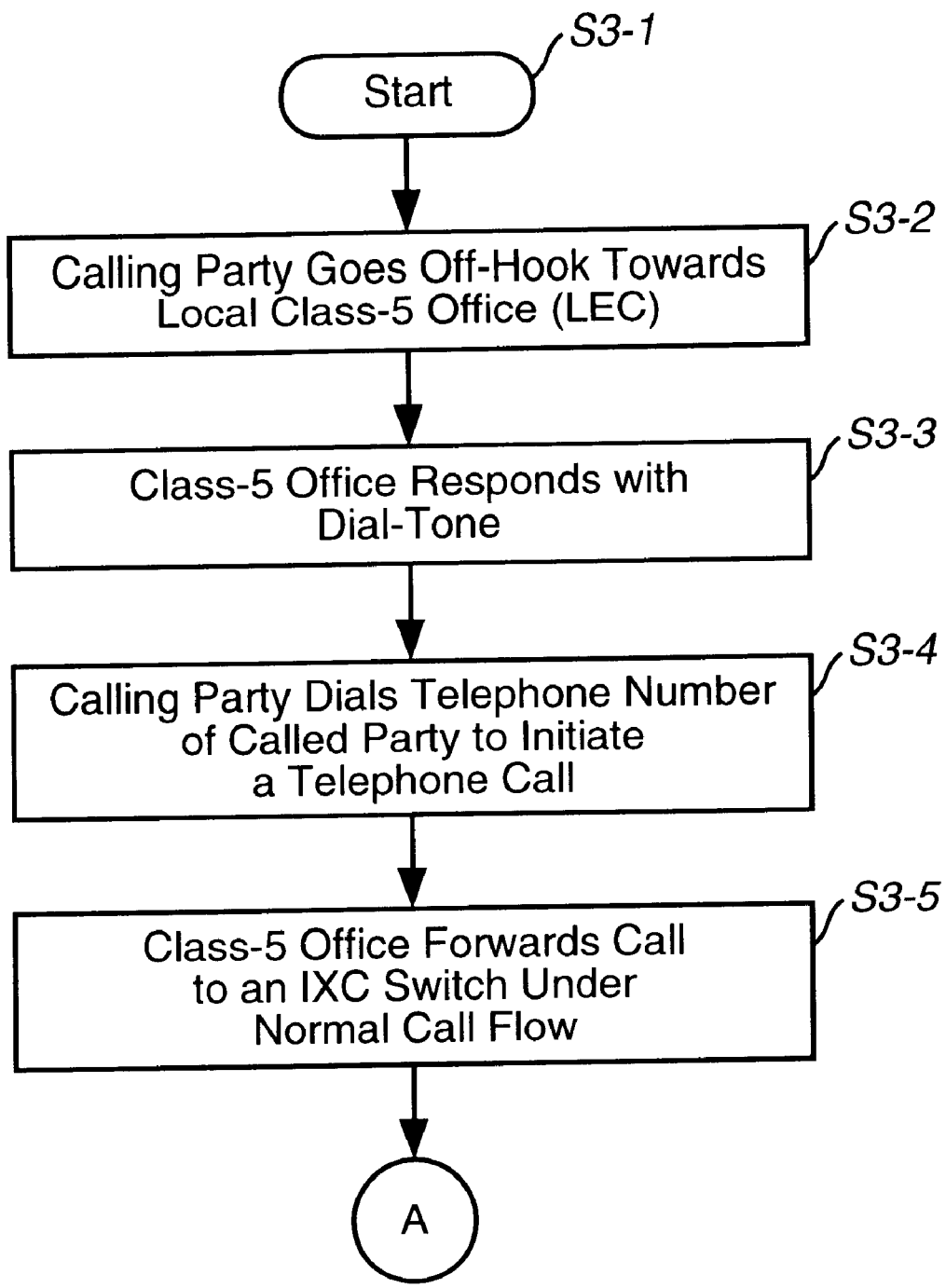
FIG. 3A is a flowchart that illustrates a process carried out within the system depicted in FIG. 2 to effect intra-call control of ancillary telecommunications devices such as echo cancellers, etc.
Figure 3B:
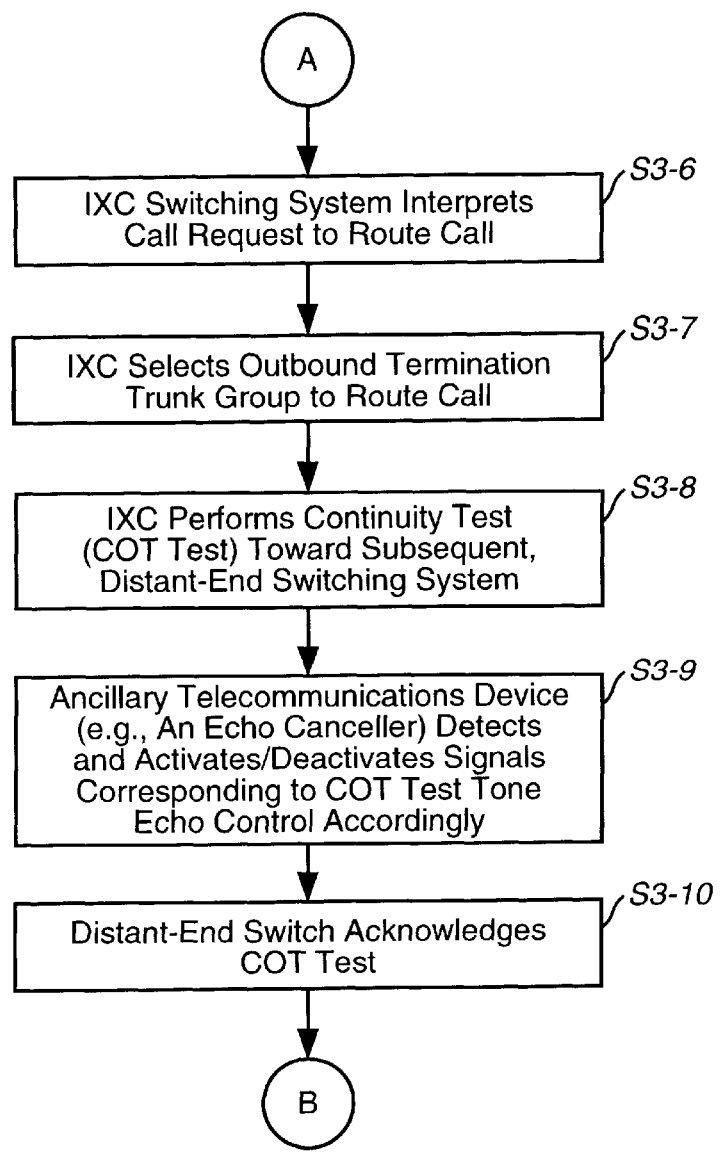
FIG. 3B is a continuation flowchart of the flowchart started in FIG. 3A.
Figure 3C:
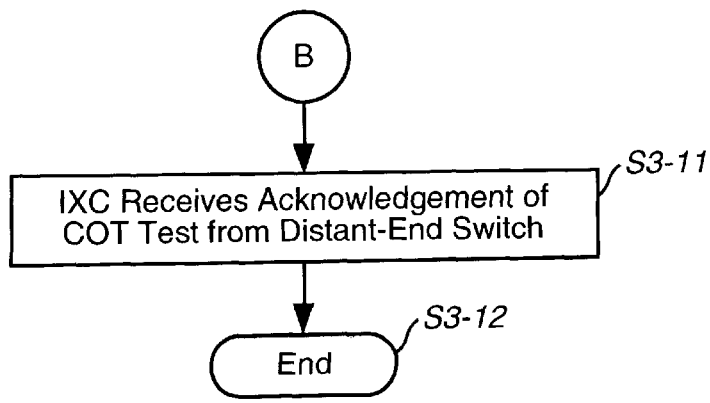
FIG. 3C is the conclusion flowchart of the flowchart started in FIGS. 3A and 3B.
Figure 4:
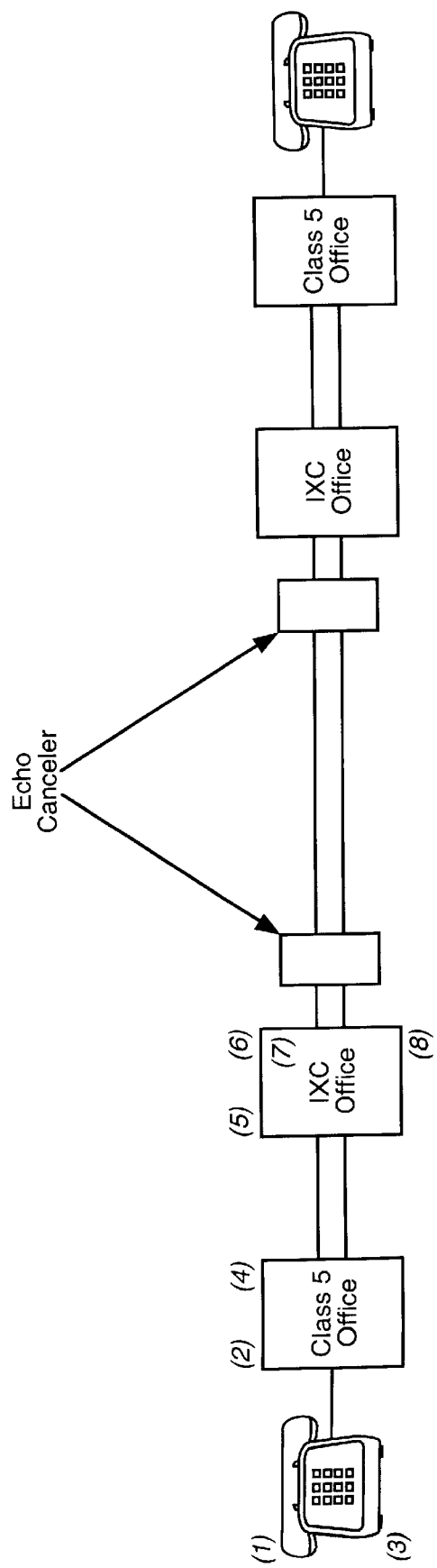
FIG. 4 is a block diagram that illustrates a second call processing scenario according to another preferred embodiment of the present invention.
Figure 5:
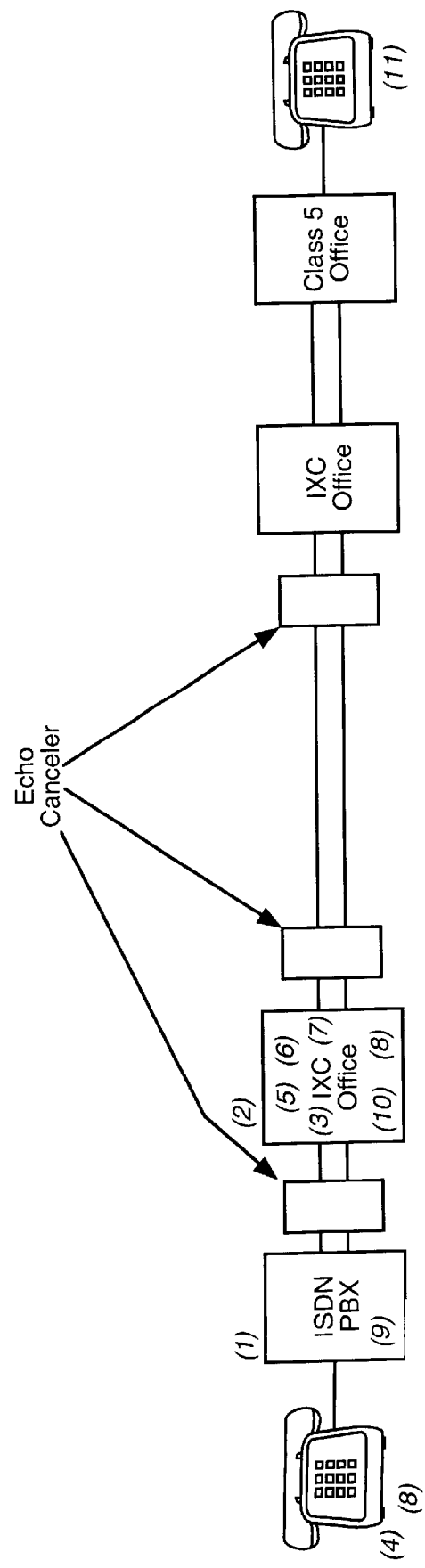
FIG. 5 is a block diagram that illustrates a third call processing scenario according to another preferred embodiment of the present invention.

To further illustrate the processes carried out within the system depicted in FIG. 2, and to illustrate the processes that may be carried out in the systems depicted in FIGS. 4 and 5, generally, reference is now made to FIGS. 3A, 3B, and 3C. In particular, depicted in FIGS. 3A, 3B and 3C, is a flowchart that illustrates the operations carried out within the system depicted in FIG. 2 to provide call by call control of ancillary telecommunications equipment according to preferred to embodiment of the present invention.

Processing starts at Step S3-1 and immediately proceeds to S3-2. At step S3-2, a calling party goes off hook towards a local class-5 office (e.g., a LEC office). Next, at Step S3-3, the class 5 office responds with a dial tone and provides the same to the calling party. Next, at step S3-4, the calling party dials a telephone number of the called party to initiate a telephone call accordingly (e.g., a voice call).

Next, at Step S3-5, the class-5 office forwards the call (request) to an IXC switch under normal call flow.

Processing continues at the top of FIG. 3B.

At Step S3-6, the IXC switch interprets the call request to route the call accordingly. Next, at step S3-7, the IXC switch selects an outbound termination trunk. Thereafter, at Step S3-8, the IXC switch performs a continuity test (COT Test) toward a subsequent, distant-end switch maintained at a subsequent IXC office to determine, among other things, the need and or applicability of echo control. Next, at Step S3-9, an ancillary device, (e.g., an echo canceller, etc.) detects and reads the signal corresponding to the COT test/tones and activates/deactivates accordingly (e.g., activates/deactivates echo-control, etc.). At step S310, the distant-end switch acknowledges the COT test and processing proceeds at the top of FIG. 3C.

At Step S3-11, the IXC switch receives acknowledgement of the COT test from the distant-end switch. Thereafter, at Step S3-11, Processing ends at Step S3-12.

Referring now to FIG. 4, depicted therein is a block diagram that illustrates a second call processing scenario according to another preferred embodiment of the present invention. In particular, in the call scenario depicted in FIG. 4, a calling party is placing a digital data call. In this case, an ancillary device such as an echo canceller is to be left inactive (or placed into an inactive state). Accordingly, at point 1, the calling party goes off hook towards the local class-5 office. At point 2, the class-5 office responds with a dial tone appropriately. At point 3, the calling party dials the telephone number for the termination location corresponding to the called party. At point 4, the class-5 switch forwards the call request information to an IXC switch under normal call flow. At point 5, the IXC switch interprets the call request for call routing accordingly. At point 6, the IXC switch selects an outbound termination trunk for further call routing. At point 7, the IXC switch performs a COT test with a LO tone, and the echo canceler being controlled responds to the LO tone and goes into a bypass mode. At point 8, the IXC switch receives an acknowledgment of the COT test from a distant end switch.

Referring now to FIG. 5, depicted therein is a block diagram that illustrates a third call processing scenario according to another preferred embodiment of the present invention. In particular, in this call processing scenario, an echo canceler is located on an access or customer circuit (e.g., PBX, etc.). In this example, the customer circuit is an ISDN Primary Rate Interface (PRI) configured as 23 bearer and 1 data channel (23B+D). The problem with ISDN access trunks is that the length must be limited in order to accommodate possible echo conditions when interconnecting into the publicly switched telephone network (PSTN). Echo control is further compounded, for example, when the customer is using ISDN digital data features that all transmission of digital data calls at rates from 56/64 Kb/s to Nx56/64 Kb/s. Echo cancelers often corrupt such data calls as the echo cancelers cannot distinguish the same from standard voice transmissions.

Accordingly, to effect appropriate echo cancellation, the following call processing scenario is carried out: At point 1 the ISDN end user goes off-hook towards the IXC office and signals on the D channel the type of call connection being required. At point 2, the IXC office responds with the appropriate D channel message. At point 3, the IXC switch recognizes the call type as a data connection and issues a LO tone towards the echo canceler and the canceler goes into a bypass mode on the appropriate bearer channels. At point 4, the end user dials the number for termination. At point 5, the IXC switch interprets the call request and routes the call accordingly. At point 6, the IXC switch selects an outbound termination trunk. At point 7, the IXC switch performs a COT test with a LO tone. The echo canceler interprets the LO tone and assumes a bypass state. At point 8, the IXC receives acknowledgment of COT from the distant end switchAnd, at point 10, the distant end termination completes the call as requested.

Using the call connection shown in FIG. 5 and assuming that the calling party has the capability to support voice and data services within the same call connection. That being that at some time during the call connection the calling party can switch between a voice application and that of a digital data nature. This would require that the ancillary devices (ex. echo cancelers) in line with the call connection be manipulated to allow for the change in connection type during the course of the call connection.

In particular, at point 1, the ISDN end user goes off hook towards the IXC office and signals on the D channel the type of call connection being required. At point 2, the IXC office responds with the appropriate D channel message. At point 3, the IXC switch recognizes the call type as voice connection and issues a HI tone towards the echo canceler and goes into an active mode on the appropriate bearer channels. At point 4, the end user dials the number for the termination. At point 5, the IXC switch interprets the call request and routes the call accordingly. At point 6, the IXC switch selects an outbound termination trunk. At point 7, the IXC switch performs a COT test with a HI tone. The echo canceler interprets the HI tone and assumes an active state. The call completes normally. At point 8, the calling party decides to change the currently established voice connection to a digital data connection. At point 9, the ISDN PBX responds the end users request by sending the appropriate D channel message the IXC switch. At point 10 the IXC switch responds to the end users. request by issuing a LO tone on the existing connection causing the echo control devices to assume a bypass mode.

Figure 6:
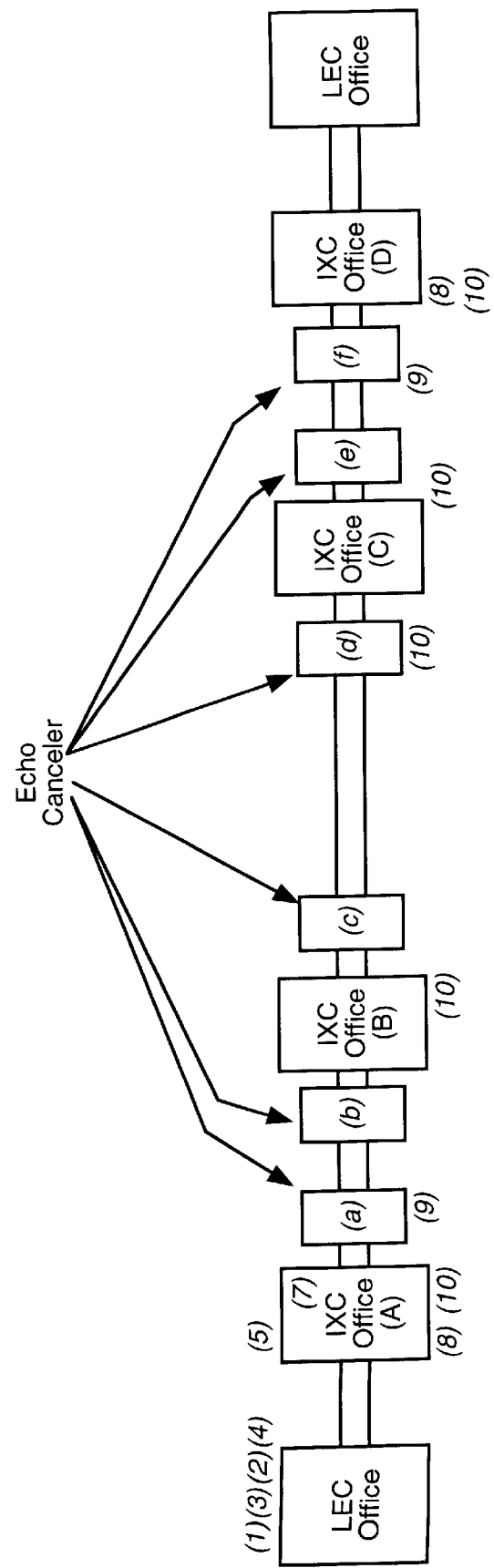
FIG. 6 is a block diagram that illustrates a fourth call processing scenario according to another preferred embodiment of the present invention.

FIG. 6 depicts a block diagram that illustrates a fourth call processing scenario according to another preferred embodiment of the present invention. In this call scenario, the call connection transverses multiple connections with echo control devices. The echo control devices may or may not be needed for the particular call type. This will require that either all echo cancelers are disabled or that only intermediate cancelers are disabled. In particular, at point 1, the calling party goes off hook towards the local class-5 office. At point 2, the class-5 office responds with a dial tone appropriately. At point 3, the calling party dials the telephone number for the termination location corresponding to the called party. At point 4, the class-5 switch forwards the call request information to an IXC switch under normal call flow. At point 5, the IXC switch interprets the call request for call routing accordingly. At point 6, the IXC switch selects an outbound termination trunk for each portion of the call connection. At point 7, the IXC switches perform COT tests with a HI tone, and the echo cancelers respond to the LO tone and go into a bypass mode. At point 8, the IXC receives acknowledgment of COT from the distant end switch.

Using the same call connection shown in FIG. 6, and assuming the echo cancelers could respond in some manner back to the initiating switch (e.g., the echo cancelers receive a LO tone and return a HI tone back to the initiating switch), then the intermediate echo control devices could be manipulated as well. Such an alternative call processing scenario is next described with continued reference to FIG. 6.

In particular, at point 1, the calling party goes off hook towards the local class-5 office. At point 2, the class-5 office responds with a dial tone appropriately. At point 3, the calling party dials the telephone number for the termination location corresponding to the called party. At point 4, the class-5 switch forwards the call request information to an IXC switch under normal call flow. At point 5, the IXC switch interprets the call request for call routing accordingly. At point 6, the IXC switch selects an outbound termination trunk for each portion of the call connection. At point 7, the IXC switches perform COT with the HI tone. At point 8, the IXC receives acknowledgment of COT from the distant end switch. At point 9, the echo cancelers respond to the HI tone and go into an active state. The echo cancelers also block the return HI tone from the distant IXC switch and passes a LO tone back to the initiating switch. And, at point 10, the originating switch will interpret the returned LO tone as an indication of the echo control devices being set and will instruct down line devices to bypass the remaining echo cancelers.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A system for controlling a telecommunications device within a call processing environment during a call, comprising:

a switching system configured to receive a call from a calling station and to route said call within said call processing environment;

an ancillary telecommunications device configured to control a call processing parameter to affect said call;

said switching system and said ancillary telecommunications device being coupled to each other via a network, said network configured to communicate data corresponding to said call, whereby said ancillary telecommunications device controls said call processing parameter to affect said call based on a continuity test issued by said switching system to said ancillary telecommunications device during said call, said continuity test issued via said network.

2. The system according to claim 1, wherein said ancillary telecommunications device is an echo canceler.

3. The system according to claim 1, wherein said channelized call data network is a frame-based digital telecommunications network and said directive includes modulated bits within corresponding frames of data corresponding to said call.

4. The system according to claim 1, wherein said call processing parameter is an echo cancellation parameter related to said call.

5. The system according to claim 1, wherein said ancillary telecommunications indicates a status condition to said switching system by issuing a corresponding response to said continuity test within said at least one channel of said channelized call data network.

6. A system for controlling a telecommunications device within a call processing environment, comprising:
a first switching system configured to receive a call from a calling station and to route said call within said call processing environment;
an ancillary telecommunications device configured to control a call processing parameter related to said call;
a second switching system configured to routed said call within said call processing environment toward a call termination station;
said first switching system, said second switching system and said ancillary telecommunications device being coupled to each other via a channelized call data network, said channelized call data network configured to communicate data corresponding to said call over at least one channel; and
said first switching system and said second switching system being coupled to each other via a dedicated signaling network, said dedicated signaling network configured to allow said first switching system and said second switching system to communicate control messages to each other, said control messages related to the routing and processing of said call,
whereby said ancillary telecommunications device controls said call processing parameter to affect said call based on a continuity test issued by said first switching system to said ancillary device, said continuity test contained within said at least one channel of said channelized call data network.

7. The system according to claim 6, wherein said ancillary telecommunications device is an echo canceler.

8. The system according to claim 6, wherein said channelized data network is a frame-based digital telecommunications network, and said continuity test includes modulated bits of particular channels within corresponding frames of data corresponding to said call.

9. The system according to claim 6, wherein said call processing parameter is an echo cancellation parameter related to said call.

10. The system according to claim 6, wherein said continuity test controls said ancillary telecommunications device to affect said call before said call is routed within said call processing environment.

11. The system according to claim 6, wherein said continuity test controls said ancillary telecommunications device to affect said call during said call.

12. The system according to claim 6, wherein said continuity test controls said ancillary telecommunications device to affect said call after said call is routed within said call processing environment.

13. A method for controlling a telecommunications device within a call processing environment during a call, comprising the steps of:
receiving a call at a switching system within said call processing environment;
determining from said call whether a call processing parameter need be controlled to process said call; and
causing an ancillary telecommunications device coupled to said switching system via a channelized call data network to control said call processing parameter during said call, said ancillary telecommunications device controlling said call processing parameter to affect said call based on a continuity test issued by said switching system to said ancillary device during said call.

14. The method according to claim 13, wherein said ancillary telecommunications device is an echo canceller and said call processing parameter is an echo cancellation parameter controllable by said echo canceller.

15. The method according to claim 13, wherein said continuity test causes said ancillary telecommunications device to be placed in an active state.

16. The method according to claim 13, wherein said continuity test causes said ancillary telecommunications device to be placed in an inactive state.

17. A system for controlling a telecommunications device within a call processing environment, comprising:
a first switching system configured to receive a call from a calling station and to route said call within said call processing environment;
an ancillary telecommunications device configured to control a call processing parameter to affect said call;
a second switching system configured to route said call within said call processing environment toward a call termination station; and
said first switching system, said second switching system and said ancillary telecommunications device being coupled to each other via a channelized call data network, said channelized call data network configured to communicate data corresponding to said call over at least one channel of said channelized call data network,
whereby said ancillary telecommunications device controls said call processing parameter to affect said call based on a continuity test issued by said first switching system to said ancillary device.

18. The system according to claim 17, wherein said ancillary telecommunications device is an echo canceller.

19. The system according to claim 17, wherein said continuity test includes a plurality of modulated signals generated based on corresponding operating parameters associated with said ancillary telecommunications device.

20. The system according to claim 17, wherein said call processing parameter is an echo cancellation parameter related to said call.

21. The system according to claim 17, wherein said continuity test controls said ancillary telecommunications device to affect said call before said call is routed within said call processing environment.

22. The system according to claim 17, wherein said continuity test controls said ancillary telecommunications device to affect said call during said call.

23. The system according to claim 17, wherein said continuity test controls said ancillary telecommunications device to affect said call after said call is routed within said call processing environment.

24. A method for controlling a telecommunications device within a call processing environment prior to establishing a call connection, comprising the steps of:
receiving a request for service at a switching system within said call processing environment;

determining from said request for service whether a call processing parameter need be controlled to process said call; and causing an ancillary telecommunications device coupled to said switching system via a channelized call data network to control said call processing parameter prior to establishing said call connection, said ancillary telecommunications device controlling said call processing parameter to affect said call based on a continuity test issued by said switching system to said ancillary device prior to establishing said call connection.

25. The method according to claim 24, wherein said ancillary telecommunications device is an echo canceller and said call processing parameter is an echo cancellation parameter controllable by said echo canceller.

26. The method according to claim 24, wherein said continuity test causes said ancillary telecommunications device to be placed in an active state.

27. The method according to claim 24, wherein said continuity test causes said ancillary telecommunications device to be placed in an inactive state.

28. The method according to claim 24 further comprising resetting the ancillary telecommunications device for a next call instance of a request for service.

29. The method according to claim 13 further comprising resetting the ancillary telecommunications device for a next call instance of a request for service.

30. A method for controlling an ancillary telecommunications device from a switching system within a call processing environment, comprising the steps of:

receiving a request for service;

determining from the request for service whether a call processing parameter need be controlled to process the call; and issuing a continuity test (COT) tone to the ancillary telecommunications device, thereby causing the ancillary telecommunications device to control the call processing parameter to affect the call in response to the continuity test (COT) tone.

31. The method of claim 30, wherein continuity test (COT) tone is issued at a frequency of 1780 Hz or 2000 Hz.

* * * * *